United States Patent
Takeda

(10) Patent No.: US 9,930,194 B2
(45) Date of Patent: Mar. 27, 2018

(54) INFORMATION PROCESSING SYSTEM, INFORMATION PROCESSING APPARATUS, AND INFORMATION PROCESSING METHOD FOR SPECIFYING APPLICATION ASSOCIATED WITH FUNCTION OF DEVICE

(71) Applicant: Saeko Takeda, Kanagawa (JP)

(72) Inventor: Saeko Takeda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/878,342

(22) Filed: Oct. 8, 2015

(65) Prior Publication Data
US 2016/0119491 A1    Apr. 28, 2016

(30) Foreign Application Priority Data
Oct. 22, 2014    (JP) .................................. 2014-215694

(51) Int. Cl.
*H04N 1/00* (2006.01)
*H04N 1/32* (2006.01)

(52) U.S. Cl.
CPC ..... *H04N 1/00244* (2013.01); *H04N 1/00204* (2013.01); *H04N 1/32* (2013.01); *H04N 2201/0094* (2013.01); *H04N 2201/3205* (2013.01)

(58) Field of Classification Search
CPC .. H04N 1/00244; H04N 1/00204; H04N 1/32; H04N 2201/3205
USPC .......................... 358/1.15; 715/700, 783, 810
See application file for complete search history.

(56) References Cited

U.S. PATENT DOCUMENTS

| | | | |
|---|---|---|---|
| 8,745,153 B2 | 6/2014 | Gharabally et al. | |
| 2002/0144257 A1* | 10/2002 | Matsushima | G06F 21/51 717/178 |
| 2012/0326962 A1* | 12/2012 | Asai | H04N 1/00474 345/156 |

FOREIGN PATENT DOCUMENTS

| | | |
|---|---|---|
| JP | 2009-140347 | 6/2009 |
| JP | 2010-182309 | 8/2010 |

* cited by examiner

*Primary Examiner* — Jamares Q Washington
(74) *Attorney, Agent, or Firm* — Oblon, McClelland, Maier & Neustadt, L.L.P.

(57) ABSTRACT

An information processing system includes an acquisition unit, a first specifying unit, a second specifying unit, and a display controller. The acquisition unit acquires device specifying information. Based on first correspondence information in which each the device specifying information is associated with first function information representing a function that the device has, the first specifying unit specifies the first function information associated with the device specifying information acquired by the acquisition unit. Based on second correspondence information in which each application is associated with second function information representing a function necessary to use the application, the second specifying unit specifies an application associated with the second function information representing a function contained in the first function information specified by the first specifying unit. The display controller performs control for displaying an application list screen for providing the application specified by the second specifying unit on the device.

7 Claims, 9 Drawing Sheets

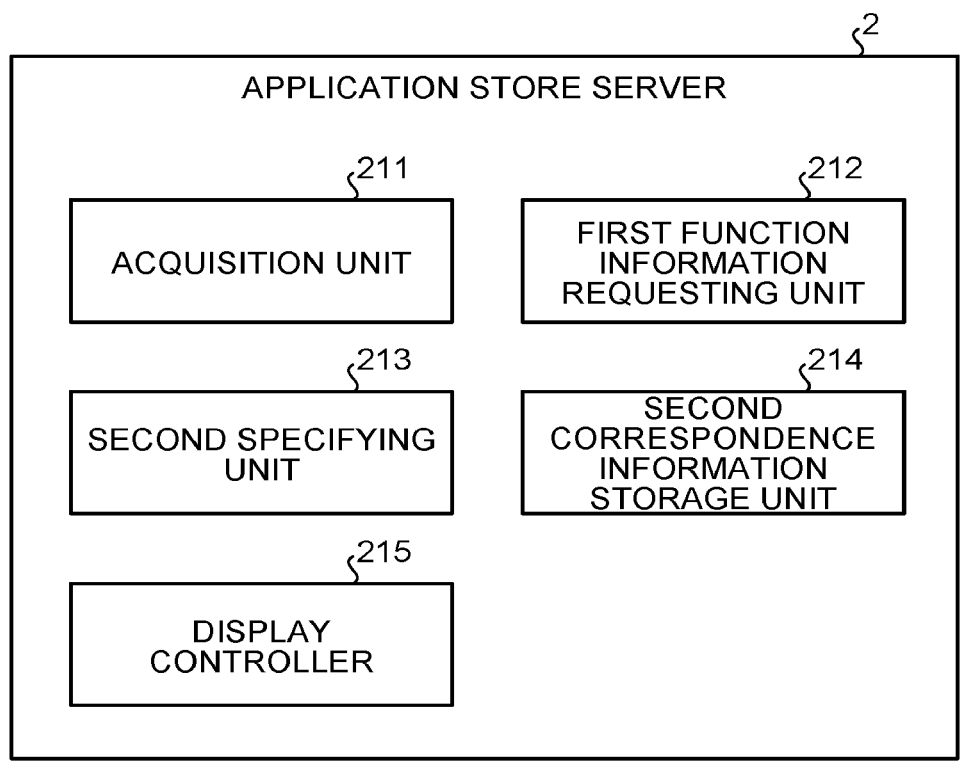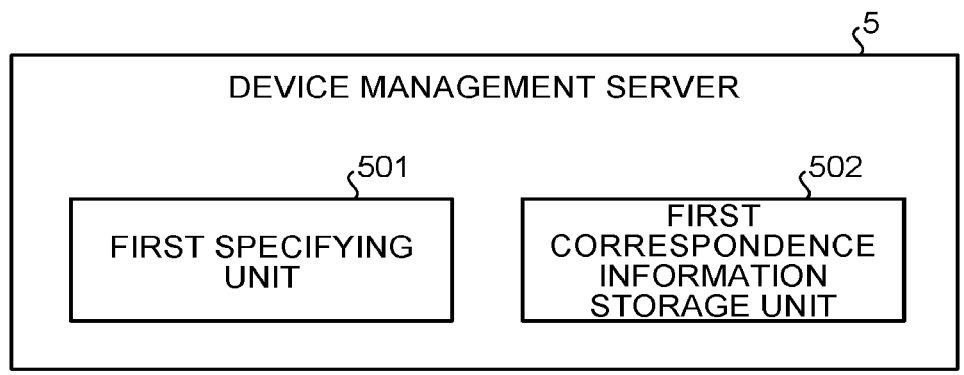

FIG.8

FIRST FUNCTION INFORMATION

| DEVICE SPECIFYING INFORMATION | DEVICE CONFIGURATION INFORMATION KEY | DEVICE CONFIGURATION INFORMATION VALUE |
|---|---|---|
| 3284CA | PRINT COLOR TYPE | COLOR |
| | FAX FUNCTION | YES |
| | DUPLEX UNIT | YES |
| | OCR FUNCTION | NO |
| | SADDLE-STITCHING/ STAPLING FUNCTION | NO |
| | PUNCHING FUNCTION | NO |

FIG.9

| APPLICATION NAME | SECOND FUNCTION INFORMATION |
|---|---|
| TRANSLATION APPLICATION | OCR FUNCTION: YES |
| EASY FAX APPLICATION | FAX FUNCTION: YES |
| MATERIAL PRINT APPLICATION | PRINT COLOR TYPE: COLOR |

INFORMATION PROCESSING SYSTEM, INFORMATION PROCESSING APPARATUS, AND INFORMATION PROCESSING METHOD FOR SPECIFYING APPLICATION ASSOCIATED WITH FUNCTION OF DEVICE

CROSS-REFERENCE TO RELATED APPLICATIONS

The present application claims priority to and incorporates by reference the entire contents of Japanese Patent Application No. 2014-215694 filed in Japan on Oct. 22, 2014.

BACKGROUND OF THE INVENTION

1. Field of the Invention

The present invention relates to an information processing system, an information processing apparatus, and an information processing method.

2. Description of the Related Art

In recent years, because of spread of various communication devices represented by mobile phones and information mobile terminals, development of applications usable on communication devices is growing. In order to promote the use of these applications, websites and applications that introduce applications and enable direct download and installation of the applications into a communication device are also being developed.

SUMMARY OF THE INVENTION

According to an aspect of the present invention, there is provided an information processing system including: an acquisition unit that acquires device specifying information that uniquely specifies a device; a first specifying unit that, on the basis of first correspondence information in which each the device specifying information is associated with first function information representing a function that the device has, specifies the first function information associated with the device specifying information acquired by the acquisition unit; a second specifying unit that, on the basis of second correspondence information in which each application is associated with second function information representing a function necessary to use the application, specifies an application associated with the second function information representing a function included in the first function information specified by the first specifying unit; and a display controller that performs control for displaying an application list screen for providing the application specified by the second specifying unit on the device that is specified by the device specifying information acquired by the acquisition unit.

According to another aspect of the present invention, there is provided an information processing apparatus including: an acquisition unit that acquires device specifying information that uniquely specifies a device; a first specifying unit that, on the basis of first correspondence information in which each the device specifying information is associated with first function information representing a function that the device has, the first function information associated with the device specifying information acquired by the acquisition unit; a second specifying unit that, on the basis of second correspondence information in which each application is associated with second function information representing a function necessary to use the application, specifies an application associated with the second function information representing a function included in the first function information specified by the first specifying unit; and a display controller that performs control for displaying an application list screen for providing the application specified by the second specifying unit on the device that is specified by the device specifying information acquired by the acquisition unit.

According to still another aspect of the present invention, there is provided an information processing method including: acquiring device specifying information that uniquely specifies a device; first specifying of, on the basis of first correspondence information in which each the device specifying information is associated with first function information representing a function that the device has, specifying the first function information associated with the device specifying information acquired at the acquiring; second specifying of, on the basis of second correspondence information in which each application is associated with second function information representing a function necessary to use the application, specifying an application associated with the second function information representing a function contained in the first function information specified at the first specifying; and performing control for displaying an application list screen for providing the application specified at the second specifying on the device that is specified by the device specifying information acquired at the acquiring.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a diagram showing an exemplary functional configuration of an application store server;

FIG. 7 is a diagram showing an exemplary functional configuration of a device management server;

FIG. 8 is a diagram showing exemplary first correspondence information;

FIG. 9 is a diagram showing exemplary second correspondence information;

DETAILED DESCRIPTION OF THE PREFERRED EMBODIMENTS

An embodiment of the information processing system, the information processing apparatus, and the information processing method according to the present invention will be described in detail below with reference to the accompanying drawings. As an example of the device according to the present invention, a multifunction peripheral (MFP) that is one mode of an image forming apparatus is exemplified below; however, the device is not limited to this. An MFP is an apparatus that has multiple different functions, such as a copy function, a scanner function, a print function, and a FAX function.

Figure 1:
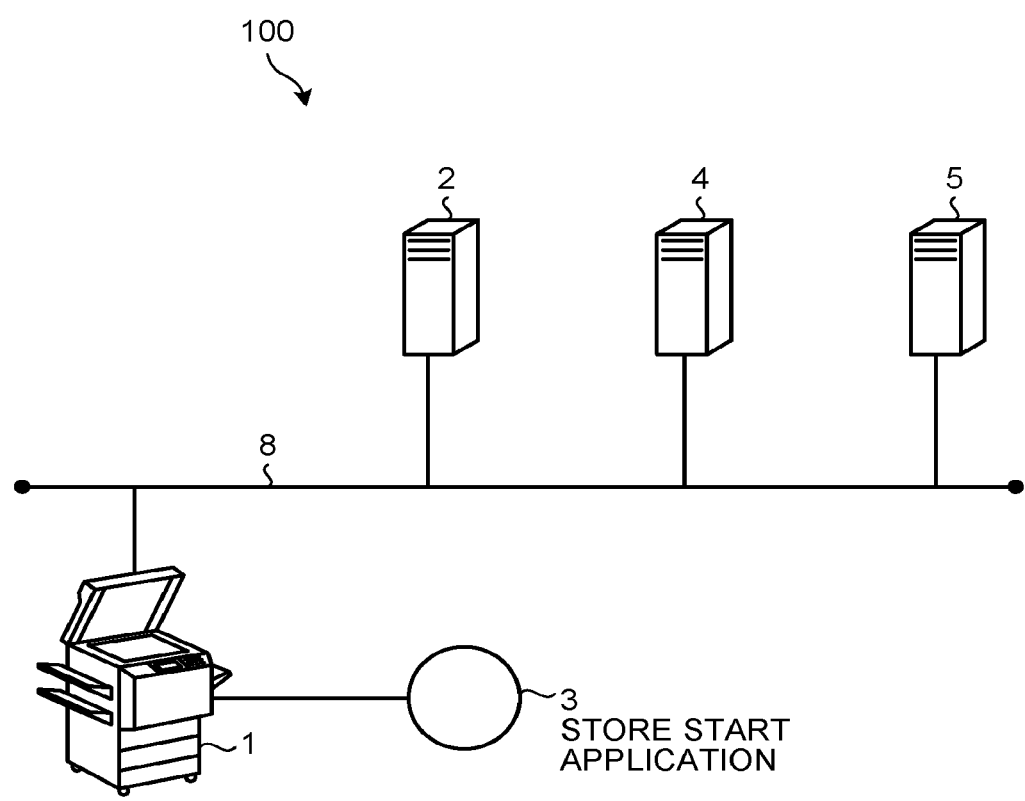
FIG. 1 is a diagram showing an exemplary schematic configuration of an information processing system.

FIG. 1 is a diagram showing an exemplary schematic configuration of an information processing system 100 according to the embodiment. As shown in FIG. 1, the information processing system 100 includes an MFP 1, an application store server 2, a translation server 4, and a device management server 5 that are connected via a network 8 to one another.

The application store server 2 displays a list of applications usable by the MFP 1 and provides, to the MFP 1, a web page for subscription for the use of each application or downloading each application, i.e., a web page for providing an application usable by the MFP 1 (hereinafter, referred to as an "application store 6"). More specific descriptions will be given below. In this example, the application store 6 corresponds to the "application list screen" according to the claims. Furthermore, in this example, according to the descriptions of an application for acquiring the application store 6 from the application store server 2 and displaying the application store 6 on the MFP 1 (hereinafter, referred to as a "store start application 3") and an application for providing the functions of a web browser (hereinafter, referred to as a "browser application 2b") are installed in the MFP 1. Specific description of the MFP 1 will be given below.

The translation server 4 provides a translation application that is one of applications provided by the application store 6. Specific description of the translation server 4 will be given below.

The device management server 5 manages, for each device that the information processing system 100 includes, device specifying information that uniquely specifies the device and first function information representing the functions that the device has by associating them with each other (by linking them to each other). Specific description will be given below. For the convenience of description, FIG. 1 exemplifies only the single MFP 1 as the device that the information processing system 100 includes. Alternatively, the number and type of devices that the information processing system 100 includes are arbitrary.

Figure 2:
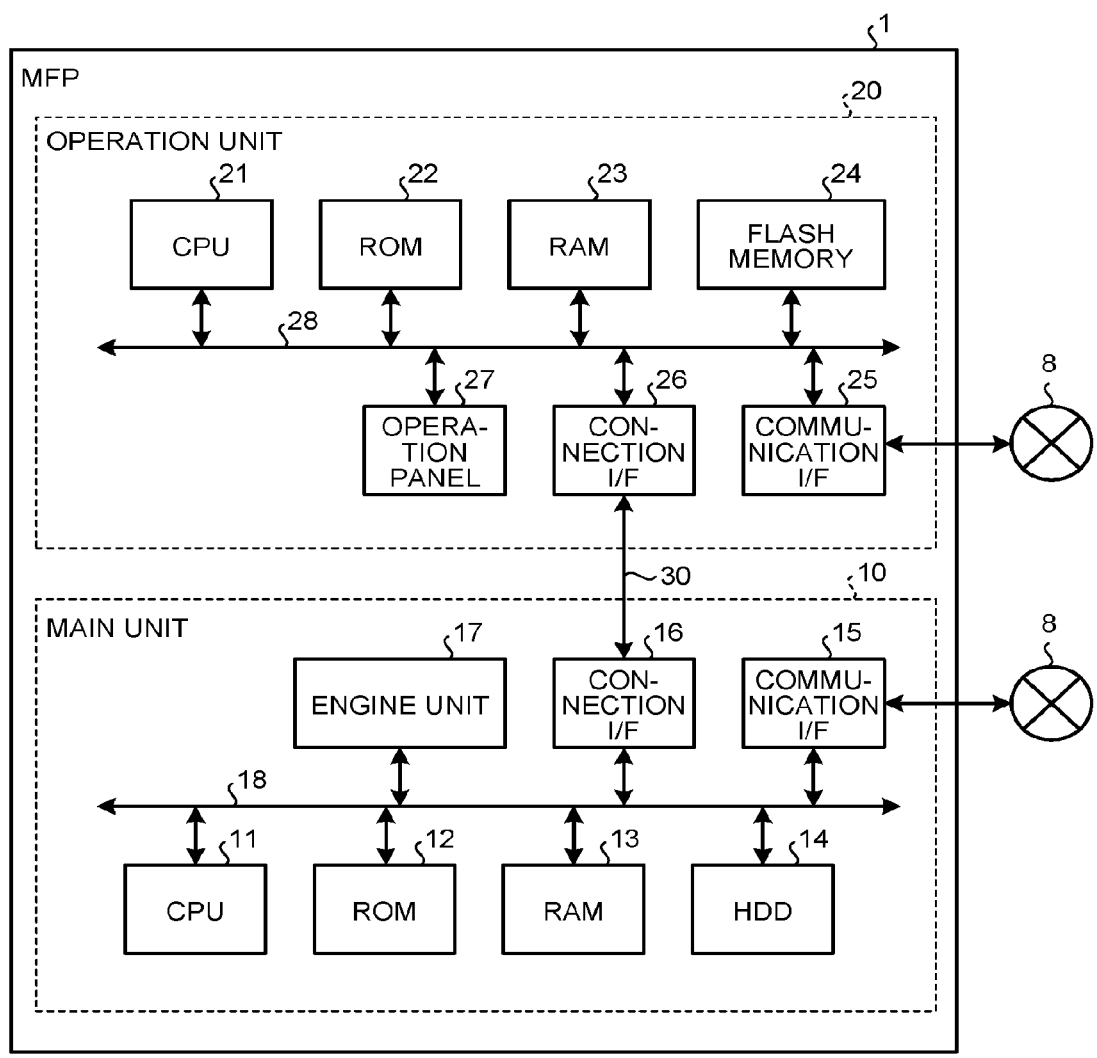
FIG. 2 is a diagram showing an exemplary hardware configuration of an MFP.

With reference to FIG. 2, the hardware configuration of the MFP 1 will be described. As shown in FIG. 2, the MFP 1 includes a main unit 10 capable of implementing various functions, such as the copy function, the scanner function, the FAX function, and the printer function, and an operation unit 20 that accepts operations by a user. Accepting an operation by the user is an idea including reception of information (including, for example, a signal representing the value of coordinates of the screen) that is input in accordance with an operation by the user. The main unit 10 and the operation unit 20 are communicably connected to each other via a dedicated communication path 30. For the communication path 30, for example, it is possible to use a communication path according to the universal serial bus (USB) standard. Alternatively, a communication path according to an arbitrary standard may be used regardless whether the communication path is wired or wireless.

The main unit 10 is capable of performing operations according to an operation accepted by the operation unit 20. The main unit 10 is communicable with an external device, such as a client PC (personal computer) and of performing an operation according to an instruction received from the external device.

The hardware configuration of the main unit 10 will be described first. As shown in FIG. 2, the main unit 10 includes a CPU 11, a ROM 12, a RAM 13, a hard disk drive (HDD) 14, a communication interface (I/F) 15, a connection I/F 16, and an engine unit 17 that are connected one another via a system bus 18.

The CPU 11 comprehensively controls operations of the main unit 10. The CPU 11 controls entire operations of the main unit 10 by executing a program stored in, for example, the ROM 12 or the HDD 14 by using the RAM 13 as a work area and implements various functions, such as the copy function, the scanner function, the FAX function, and the printer function that are described above.

The communication I/F 15 is an interface for connecting to the network 8. The connection I/F 16 is an interface for communicating with the operation unit 20 via the communication path 30.

The engine unit 17 is hardware that performs general information processing and processing other than communications in order to implement the copy function, the scanner function, the FAX function, and the printer function. For example, the engine unit 17 includes, for example, a scanner (image reading unit) that reads an image on an original by scanning, a plotter (image forming unit) that performs printing on a sheet material, such as paper, and a FAX unit that performs FAX communications. The engine unit 17 may further include a finisher that sorts printed sheets and a specific option, such as an automatic document feeder (ADF) that automatically feeds an original.

The hardware configuration of the operation unit 20 will be described here. As shown in FIG. 2, the operation unit 20 includes a CPU 21, a ROM 22, a RAM 23, a flash memory 24, a communication I/F 25, a connection I/F 26, and an operation panel 27 that are connected to one another via a system bus 28.

The CPU 21 comprehensively controls operations of the operation unit 20. The CPU 21 controls entire operations of the operation unit 20 by executing a program stored in, for example, the ROM 22 or the flash memory 24 by using the RAM 23 as a work area and implements various functions, such as displaying of information (image) corresponding to an input received from the user.

The communication I/F 25 is an interface for connecting to the network 8. The connection I/F 26 is an interface for communicating with the main unit 10 via the communication path 30.

The operation panel 27 receives various inputs corresponding to operations by the user and displays various types of information (such as information corresponding to an accepted operation, information representing the operation status of the MFP 1, and information representing the setting state). In this example, the operation panel 27 is configured of a liquid crystal display device (LCD) with a touch panel function. Alternatively, for example, the operation panel 27 may be configured of an organic EL display device in which a touch panel function is installed. In addition to, or instead of, this, an operation unit, such as a hardware key, and a display unit, such as a lamp, may be provided.

Figure 3:
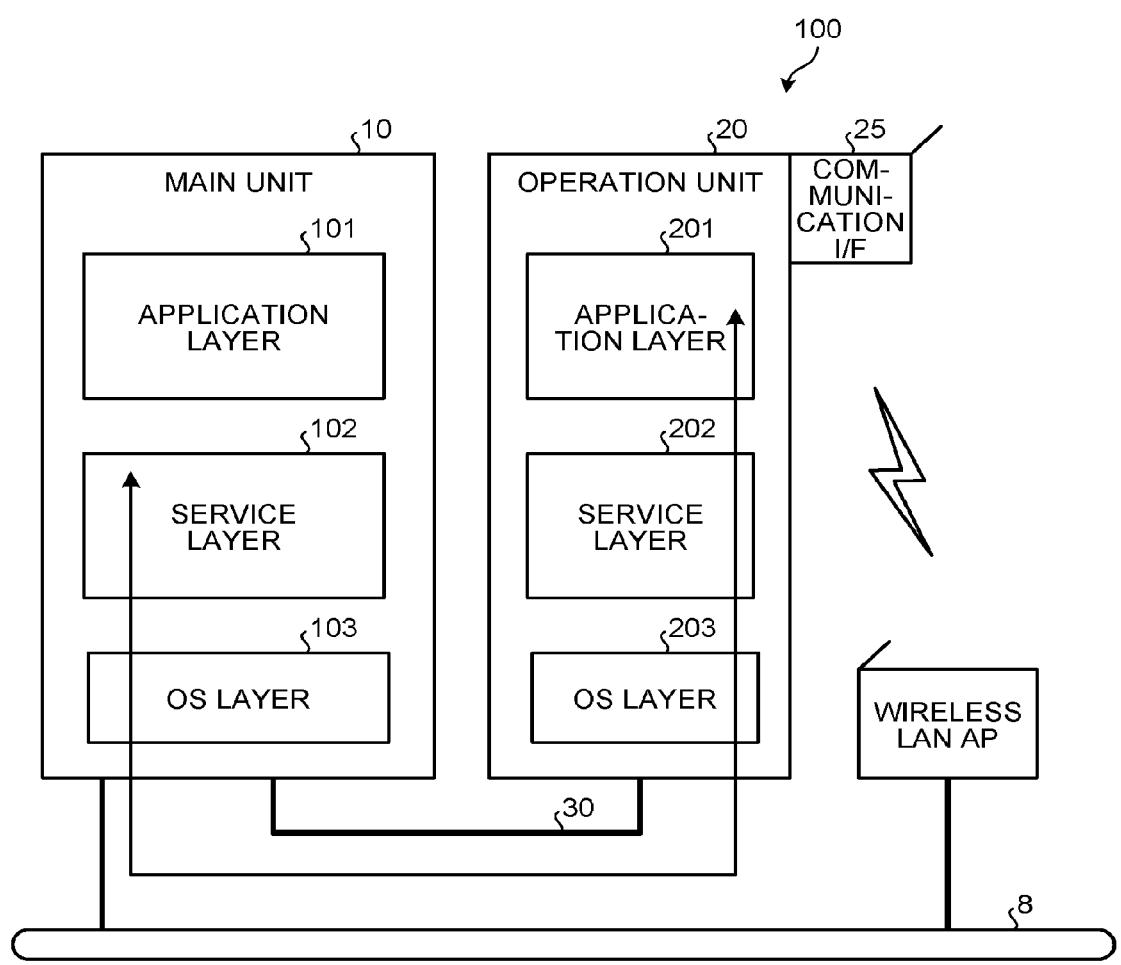
FIG. 3 is a diagram showing an exemplary software configuration of the MFP.

The software configuration of the MFP 1 will be described here. FIG. 3 is a schematic diagram showing an exemplary software configuration of the MFP 1. As shown in FIG. 3, the main unit 10 includes an application layer 101, a service layer 102, and an OS layer 103. The entity of the application layer 101, the service layer 102, and the OS layer 103 is various types of software stored in, for example, the ROM 12 and the HDD 14. The CPU 11 executes the software so that various types of functions are provided.

The software of the application layer 101 is application software (it may be simply referred to as an "application" below) for providing given functions by running hardware resources. For example, as the application, there is a copy application for providing the copy function, a scanner application for providing the scanner function, a FAX application for providing the FAX function, or a printer application for providing the printer function.

The software of the service layer 102 is software between the application layer 101 and the OS layer 103 and that is for providing, to the application, an interface for using the hardware resources that the main unit 10 includes. More specifically, it is software for providing functions of accepting an operation request to a hardware resource and arbitrates the operation request. As the operation request that the service layer 102 accepts, a request for, for example, reading by a scanner or printing by the plotter is assumed.

The function of the interface from the service layer 102 is provided to not only the application layer 101 of the main unit 10 but also an application layer 201 of the operation unit 20. In other words, the application layer 201 (application) of the operation unit 20 is also capable of implementing the functions by using the hardware resource (e.g., the engine unit 17) of the main unit 10 via the interface function of the service layer 102.

The software of the OS layer 103 is basic software (operating system (OS)) for providing basic functions that control the hardware that the main unit 10 has. The software of the service layer 102 converts requests for using the hardware resources from various applications into commands that are interpretable by the OS layer 103 and passes the commands to the OS layer 103. The software of the OS layer 103 executes the commands so that the hardware resources perform operations according to the requests from the applications.

Similarly, the operation unit 20 includes the application layer 201, a service layer 202, and an OS layer 203. The application layer 201, the service layer 202, and the OS layer 203 that the operation unit 20 includes have the same layer structure as that of the main unit 10; however, the functions provided by the applications of the application layer 201 and the type of operation requests acceptable by the service layer 202 are different from those of the main unit 10. The applications of the application layer 201 may be software for providing given functions by running the hardware resources that the operation unit 20 includes. The applications are mainly software for providing the functions of a user interface (UI) for performing operations on the functions (the copy function, the scanner function, the FAX function, and the printer function) that the main unit 10 has and for display. The applications of the application layer 201 include the browser application 2b and the store start application 3.

According to the embodiment, in order to keep independency of functions, the software of the OS layer 103 of the main unit 10 and the software of the OS layer 203 of the operation unit 20 are different from each other. In other words, the main unit 10 and the operation unit 20 operate independently of each other by using separate operating systems. For example, Linux (trademark) may be used as the software of the OS layer 103 of the main unit 10 and Android (trademark) may be used as the software of the OS layer 203 of the operation unit 20.

As described above, in the MFP 1 according to the embodiment, because the main unit 10 and the operation unit 20 operate on the separate operating systems, communications between the main unit 10 and the operation unit 20 are performed not as communications between processes in a common device but as communications between different devices. This corresponds to, for example, an operation of the operation unit 20 to transmit received information (the contents of instruction from the user) to the main unit 10 (command communications) and an operation of the main unit 10 to notify the operation unit 20 of an event. Here, the operation unit 20 communicates a command to the main unit 10, which enables use of a function of the main unit 10. As the event notified from the main unit 10 to the operation unit 20, there are the status of performance of operations by the main unit 10 and the contents of setting made by the main unit 10.

According to the embodiment, because power is supplied to the operation unit 20 from the main unit 10 via the communication path 30, it is possible to perform power control on the operation unit 20 differently (independently of) from power control on the main unit 10.

Figure 4:
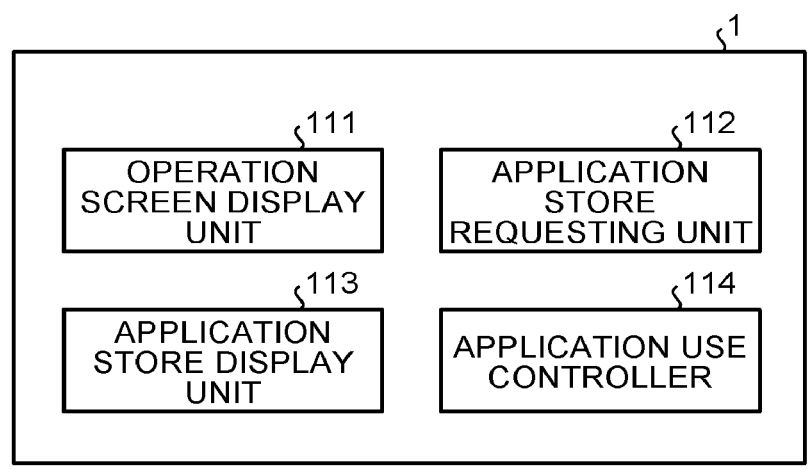
FIG. 4 is a block diagram showing an exemplary functional configuration of the MFP.

The functional configuration of the MFP 1 will be described here. FIG. 4 is a block diagram showing an exemplary functional configuration of the MFP 1. As shown in FIG. 1, the MFP 1 includes an operation screen display unit 111, an application store requesting unit 112, an application store display unit 113, and an application use controller 114. For the convenience of description, FIG. 4 mainly exemplifies functions according to the present invention; however, the functions that the MFP 1 has are not limited to them.

Figure 5:
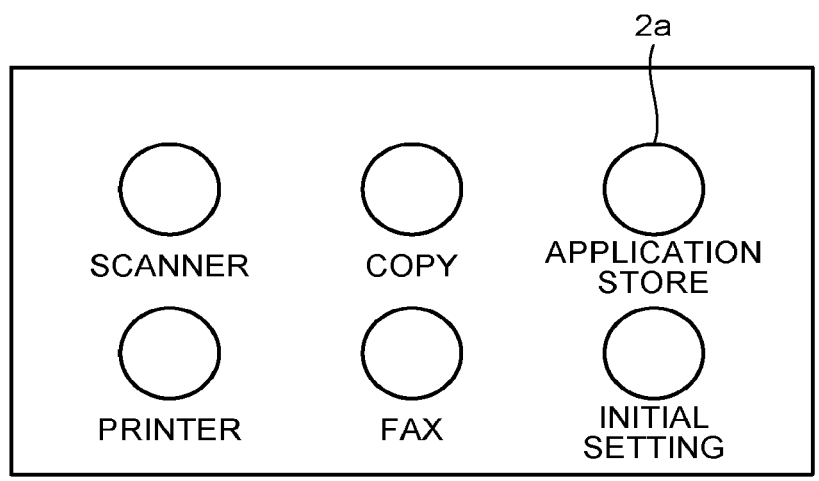
FIG. 5 is a diagram showing an exemplary operation screen.

The operation screen display unit 111 performs control for displaying an operation screen for performing various operations on the operation panel 27. FIG. 5 is a diagram showing an exemplary operation screen on which an icon 2a for starting the store start application 3 is displayed.

When the user presses the icon 2a, the store start application 3 starts. The store start application 3 (application store requesting unit 112) performs control for requesting the application store server 2 to display the application store 6. Although specific descriptions will be given below, device specifying information that enables uniquely identifying of the MFP 1 is added to the header of a signal requesting a display of the application store 6 (which may be referred to as a "display request" below).

As a response to the display request, the application store display unit 113 (the browser application 2b) performs control for displaying the application store 6 received from the application store server 2 on the operation panel 27. The application use controller 114 performs control for using an application selected by the user on the MFP 1 (including control for installing the application). Specific exemplary operations of the MFP 1 will be described below.

With reference to FIG. 6, the functional configuration of the application store server 2 will be described. As shown in FIG. 6, the application store server 2 includes an acquisition unit 211, a first function information requesting unit 212, a second specifying unit 213, a second correspondence information storage unit 214, and a display controller 215. For the convenience of description, FIG. 6 mainly exemplifies the functions according to the present invention; however, the functions that the application store server 2 has are not limited to them.

The acquisition unit 211 acquires a display request from the MFP 1. In this example, because the device specifying information is added to the header of the display request, by acquiring the display request, the acquisition unit 211 is capable of acquiring device specifying information that enables uniquely identifying of the MFP 1 that has issued the display request. In this example, the acquisition unit 211 corresponds to the "acquisition unit" according to the claims.

The first function information requesting unit 212 requests, from the device management server 5, the first function information that is associated with the device specifying information acquired by the acquisition unit 211. According to the embodiment, the first function information requesting unit 212 transmits a signal requesting the first function information (which may be referred to as a "first function information request" below) to the device management server 5 and receives, as a response to the signal, the first function information from the device management server 5. In this example, the header of the first function information request is added with the device specifying information acquired by the acquisition unit 211.

With reference to FIG. 7, the functional configuration of the device management server 5 will be described. As shown in FIG. 7, the device management server 5 includes a first specifying unit 501 and a first correspondence information storage unit 502. For the convenience of description, FIG. 7 mainly exemplifies the functions according to the invention; however, the functions that the device management server 5 has are not limited to them.

On the basis of the first correspondence information in which each set of device specifying information is associated with the first function information representing the functions that the MFP 1 (corresponding to the "device" according to the claims) has, the first specifying unit 501 specifies the first function information associated with the device specifying information acquired by the acquisition unit 211. The first function information according to the embodiment is information in which each set of function identifying information that identifies functions installable in the MFP 1 (which may be referred to as a "device configuration information key" below) is associated with values representing whether there are such functions or representing the types of the functions (which may be referred to as "device configuration information values" below).

FIG. 8 is a diagram showing first correspondence information according to the embodiment. According to the example shown in FIG. 8, a device configuration information key representing the "print color type", a device configuration information key representing the "FAX function", a device configuration information key representing a "duplex unit", a device configuration information key representing an "OCR function", a device configuration information key representing a "saddle-stitching/stapling function", and a device configuration information key representing a "punching function" are associated with the device specifying information representing "3284CA".

According to the example shown in FIG. 8, the device configuration information value corresponding to the device configuration information key representing the "print color type" represents "color", the device configuration information value corresponding to the device configuration information key representing the "FAX function" represents "yes", the device configuration information value corresponding to the device configuration information key representing the "duplex unit" represents "yes", the device configuration information value corresponding to the device configuration information key representing the "OCR function" represents "no", the device configuration information value corresponding to the device configuration information key representing the "saddle-stitching/stapling function" represents "no", and the device configuration information value corresponding to the device configuration information key representing the "punching function" represents "no". In other words, it can be considered that the first function information shown in FIG. 8 represents the color printing function, the FAX function, and the duplex printing function as the functions that the MFP 1 has and that are specified by the device specifying information representing "3284CA".

According to the example shown in FIG. 8, the first correspondence information is information in which the first information is associated with one set of device specifying information. Alternatively, for example, the first correspondence information may be information in which each of multiple sets of device specifying information is associated with first function information corresponding to the device specifying information. The first correspondence information is previously stored in the first correspondence information storage unit 502.

According to the embodiment, upon receiving a first function information request from the application store server 2 (the first function information requesting unit 212), the first specifying unit 501 determines the device specifying information that is added to the header of the received first function information request. By referring to the first correspondence information stored in the first correspondence information storage unit 502, the first specifying unit 501 specifies the first function information associated with the device specifying information added to the header of the first function information request (which can be considered as the device specifying information acquired by the acquisition unit 211). The first specifying unit 501 then sends the specified first information as a response to the first function information request.

The device management server 5 according to the embodiment has a hardware configuration of a general-use computer including a CPU, a ROM, and a RAM. The functions of the above-described first specifying unit 501 are implemented by the CPU by executing the program stored in, for example, the ROM. Alternatively, the functions may be implemented by using, for example, a dedicated hardware circuit (semiconductor integrated circuit). Furthermore, the above-descried first correspondence information storage unit 502 may be implemented by using, for example, the ROM or the RAM.

FIG. 6 will be referred back to continue explanation of the application store server 2. On the basis of the second correspondence information in which each application is associated with second function information representing the function necessary to use the application, the second specifying unit 213 specifies the application associated with the second function information representing the function contained in the first function information specified by the first specifying unit 501. FIG. 9 is a diagram showing exemplary second correspondence information according to the embodiment. According to the example shown in FIG. 9, the second function information representing the OCR function is associated with the "translation application". The translation application is an application for providing a translation service of translating PDF text information with transparent texts generated by performing OCR processing on image data read from an original and notifying the user of the translation result, where it is given that the device has the OCR function. According to the example shown in FIG. 9, the second function information representing the FAX function is associated with an "easy FAX application" for providing an easy FAX service, and the second function information representing the color printing function is associated with a "material print application" for providing a material print service. The second correspondence information is previously stored in the second correspondence information storage unit 214.

According to the embodiment, upon receiving the first function information from the device management server 5 as a response to the above-described function information request, the first function information requesting unit 212 requests the second specifying unit 213 to specify the applications associated with the second function information representing the functions contained in the first function information received from the device management server 5 (which can be considered as the first function information specified by the first specifying unit 501). Upon receiving the request, the second specifying unit 213 refers to the second correspondence information stored in the second correspondence information storage unit 214 and specifies the applications associated with the second function information representing the functions contained in the first function information received from the device management server 5.

An exemplary case will be assumed where the first function information shown in FIG. 8 is received from the device management server 5. In this case, while the functions represented by the first function information include the color printing function, the FAX function, and the duplex printing function, they do not include the OCR function, the saddle-stitching/stapling function, and the punching function. According to the example shown in FIG. 9, the translation application is excluded from applications to be specified (the second specifying unit 213 does not specify the translation application) because, while the second function information associated with the translation application represents the OCR function, the functions represented by the first function information received from the device management server 5 (the first function information specified by the first specifying unit 501) do not include the OCR function. On the other hand, according to the example shown in FIG. 9, because the second function information associated with the easy FAX application represents the FAX function and the functions represented by the first function information received from the device management server 5 include the FAX function, the second specifying unit 213 specifies the easy FAX application. According to the example shown in FIG. 9, because the second function information associated with the material print application represents the color printing function and the functions represented by the first function information received from the device management server 5 include the color printing function, the second specifying unit 213 specifies the material print application.

Figure 10:
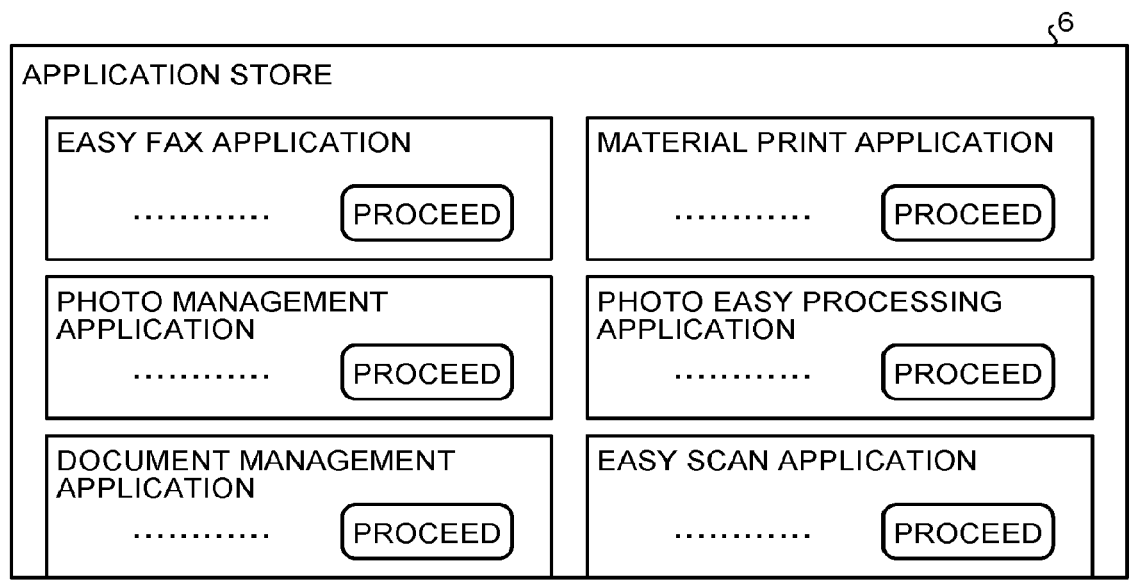
FIG. 10 is a diagram showing an exemplary application store.

FIG. 6 will be referred back to continue the explanation. The display controller 215 performs control for displaying the application store 6 for providing the applications specified by the second specifying unit 213 (corresponding to the "application list screen" according to the claims in this example) on the MFP 1 (the device specified by the device specifying information acquired by the acquisition unit 211). According to the embodiment, the display controller 215 generates the application store 6 such that applications other than the applications specified by the second specifying unit 213 are not displayed. FIG. 10 is a diagram showing an example of the application store 6 in the case where the translation application is not specified by the second specifying unit 213. The application store 6 is a web page that displays a button for, for each of the applications specified by the second specifying unit 213, proceeding subscription for the use of the application or downloading of the application (the button saying "PROCEED" in the example shown in FIG. 10). According to the example shown in FIG. 10, it is assumed that the second specifying unit 213 specifies, in addition to the easy FAX application and the material print application, a photo management application, a photo easy processing application, a document management application, and an easy scan application.

Figure 11:
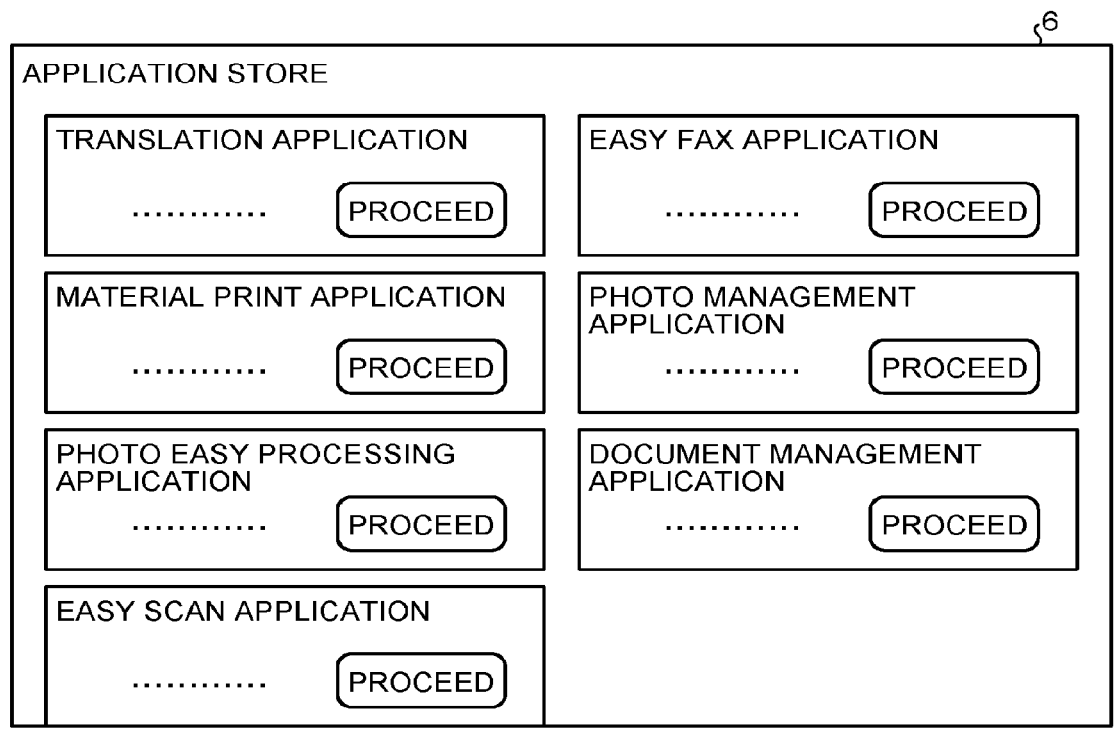
FIG. 11 is a diagram showing another exemplary application store.

FIG. 11 is a diagram showing another example of the application store 6 in a case where the second specifying unit 213 specifies the translation application. According to the example shown in FIG. 11, it is assumed that the second specifying unit 213 specifies the photo management application, the photo simple processing application, the document management application, and the easy scan application are specified in addition to the translation application, the easy FAX application, and the material print application.

According to the embodiment, the display controller 215 generates the application store 6 for providing the applications specified by the second specifying unit 213 (which can be considered as the applications usable by the MFP 1 that has issued the display request) and sends the generated application store 6 as a response to the display request received from the MFP 1. The MFP 1 (the application store display unit 113) that has issued the display request performs control for displaying, on the operation panel 27, the application store 6 received from the application store server 2 as the response to the display request. According to the embodiment, because applications displayed on the application store 6 are only applications usable by the MFP 1 that has issued the display request, the request will not be rejected when the user presses the button for proceeding subscription for the use of an application or downloading of the application (the button saying "PROCEED" in this example). Accordingly, compared to the conventional case, it is possible to improve the usability to users.

The MFP 1 that has issued the display request (the application use controller 114) performs control for using, on the MFP 1, an application that is selected by the user from among the applications displayed on the application store 6. For example, it is assumed that the application store 6 shown in FIG. 11 is displayed on the operation panel 27 of the MFP 1 and the user selects the translation application (presses the button saying "PROCEED" and shown in FIG. 11 in this example). It is here assumed that the translation application is software (i.e., a web application) that enables the use of the application arranged in the translation server 4 by using the browser application 2*b* of the operation unit 20. According to the embodiment, when the application selected by the user (the application selected from among the applications displayed on the application store 6) is a web application representing an application used via the network, the application use controller 114 executes a process for using the web application between the application use controller 114 and the application server that holds the Web application. In this example, upon detecting pressing of the button of the translation application saying "PROCEED", the application use controller 114 does not download the translation application from the translation server 4 and accesses the translation server 4 to execute a process for using the translation application (e.g., a process for registering user information that uniquely identifies the user). According to this example, it can be considered that the translation server 4 corresponds to the "application server" according to the claims.

According to the embodiment, the translation application used to provide the translation service is a web application.

Alternatively, for example, the translation application may be a general application that is installed in the operation unit 20. In this case, upon detecting pressing of the button of the translation application saying "PROCEED", the application use controller 114 performs control for downloading the translation application from the translation server 4 and installing the translation application in the MFP 1; however, the mode in which the translation application is a web application is advantageous in that the translation application does not have to be installed in the MFP 1 (the operation unit 20). This also applies to other applications displayed on the application store 6. Furthermore, the store start application 3 does not have to be an application to be installed in the MFP 1 as long as the store start application 3 has a function of acquiring device specifying information, and it may be a web application or an application in another mode.

The application store server 2 according to the embodiment has a hardware configuration of a general computer that includes a CPU, a ROM, a RAM. The functions of the acquisition unit 211, the first function information requesting unit 212, the second specifying unit 213, and the display controller 215 that are described above are implemented by the CPU by executing the program stored in, for example, the ROM. Alternatively, for example, at least part of the functions of the respective acquisition unit 211, the first function information requesting unit 212, the second specifying unit 213, and the display controller 215 described above may be implemented by using a dedicated hardware circuit (such as a semiconductor integrated circuit). The second correspondence information storage unit 214 described above is implemented by using, for example, the ROM or the RAM.

According to the embodiment, the application store server 2, the translation server 4, and the device management server 5 are independently provided. Alternatively, for example, a mode may be employed where a single server obtained by integrating them is provided. Alternatively, for example, a mode may be employed where four or more servers to which the functions of the application store server 2, the translation server 4, and the device management server 5 are distributed are provided. To be short, it suffices if a mode be employed where the information processing system 100 to which the present invention is applied has at least the function of the acquisition unit 211, the function of the first specifying unit 501, the function of the second specifying unit 213, and the function of the display controller 215.

Alternatively, for example, one single server that has the functions of the respective application store server 2 and the device management server 5 may be provided. According to this mode, it can be considered that the single server corresponds to the "information processing apparatus" according to the claims. In short, it suffices if a mode be employed where the information processing apparatus to which the invention is applied has at least the function of the acquisition unit 211, the function of the first specifying unit 501, the function of the second specifying unit 213, and the function of the display controller 215.

Figure 12:
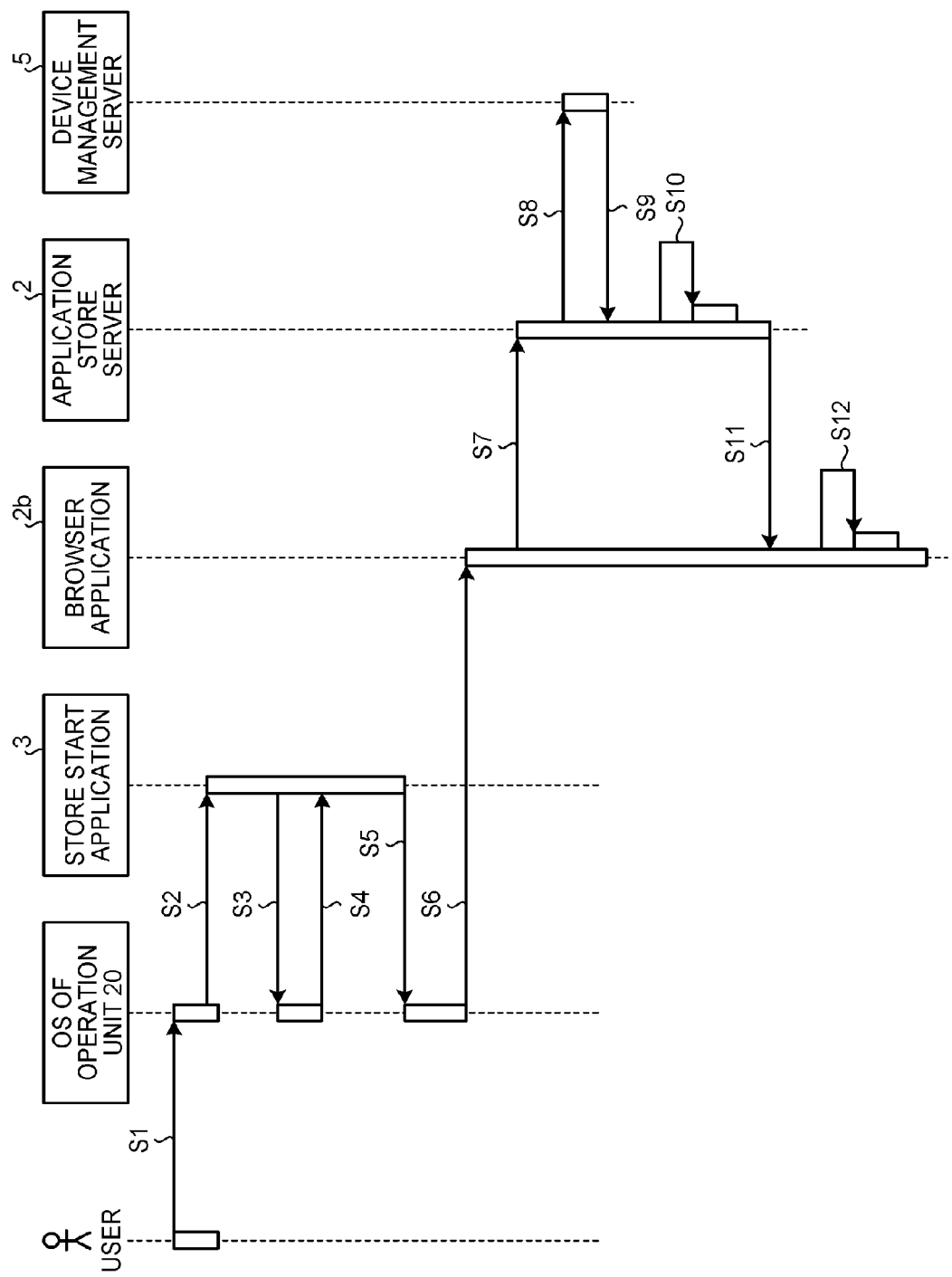
FIG. 12 is a sequence chart showing an exemplary operation procedure taken by an information processing system.

FIG. 12 is a sequence chart representing an exemplary operation procedure taken by the information processing system 100 according to the embodiment. First, when a user touches the icon 2a on the operation screen (see FIG. 5) (step S1), the OS of the operation unit 20 starts the store start application 3 (step S2). The started store start application 3 requests device specifying information that enables uniquely specifying of the MFP 1 from the OS of the operation unit 20 (step S3) and receives device specifying information as a response to the request from the OS of the operation unit 20 (step S4). The store start application 3 then requests the OS of the operation unit 20 to start the browser application 2b that is previously installed in the MFP 1 (step S5). The request is added with the device specifying information and the URL of the application store server 2, and the OS of the operation unit 20 that has received the request starts the browser application 2b. The OS of the operation unit 20 passes the device specifying information and the URL of the application store server 2 to the browser application 2b and instructs the browser application 2b to transmit the above-described display request to the application store server 2 (step S6).

The browser application 2b that has started accesses the URL of the application store server 2 and transmits the display request having the header added with the device specifying information (step S7). The application store server 2 that has received the display request from the MFP 1 transmits, to the device management server 5, a first function information request requesting first function information associated with the device specifying information added to the header of the display request (step S8). As described above, the header of the first function information request is added with the device specifying information added to the header of the display request. Upon receiving the first function information request from the application store server 2, the device management server 5 determines device specifying information added to the header. The device management server 5 refers to the first correspondence information stored in the first correspondence information storage unit 502 and specifies the first function information associated with the device specifying information. With reference to the first correspondence information stored in the first correspondence information storage unit 502, the device management server 5 specifies the first function information associated with the device specifying information. The device management server 5 sends the specified first function information as a response to the first function information request (step S9).

The application store server 2 that has received the first function information from the device management server 5 as a response to the first function information request refers to second correspondence information stored in the second correspondence information storage unit 214 and specifies the application associated with the second function information representing the functions contained in the first function information received from the device management server 5. The application store server 2 then generates the application store 6 for providing the specified application (step S10). The application store server 2 then sends the generated application store 6 as a response to the above-described display request at step S7 (step S11). The browser application 2b of the MFP 1 that has issued the display request performs control for displaying, on the operation panel 27, the application store 6 received from the application store server 2 as a response to the display request (step S12).

As described above, according to the embodiment, because the applications that are provided from the application store server 2 to the MFP1 and displayed on the application store 6 are only applications usable by the MFP 1, the request is not rejected when the user presses the button for proceeding subscription for the use of any one of the applications displayed on the application store 6 or downloading of the application (the button saying "PROCEED" in the example). This makes it possible to improve the usability to users.

The functions of the respective units (the operation screen display unit 111, the application store requesting unit 112, the application store display unit 113, and the application use controller 114) of the MFP 1 described above are implemented by the CPU by executing a program stored in a storage device (such as the ROM 12, the HDD 14, the ROM 22, or the flash memory 24). Alternatively, for example, at least part of the functions of the respective units of the MFP 1 may be implemented by using a dedicated hardware circuit (e.g., a semiconductor integrated circuit).

According to the embodiment, the main unit 10 and the operation unit 20 operate independently of each other by using separate operation systems. Alternatively, for example, a mode may be employed where the main unit 10 and the operation unit 20 operate by using the same operation system.

The program executed by the information processing system 100 (the MFP 1, the application store server 2, and the device management server 5) according to the above-described embodiment may be configured to be provided by way of recording it in a computer-readable recording medium, such as a CD-ROM, a flexible disk (FD), a CD-R, a digital versatile disk (DVD), or a universal serial bus (USB) or may be configured to be provided or distributed via a network, such as the Internet. Alternatively, various programs may be configured to be provided by way of previously installing them in a ROM, etc.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that is connected to an application store server via a network, the application store server transmitting a web page for providing an application usable by the image forming apparatus, the image forming apparatus comprising:
a main body including a printer or a scanner;
an operation unit through which a request to the application store server and an instruction to the main body are performed and on which various types of information is displayed; and
circuitry configured to
receive, from a user, a command to request the web page including information of a plurality of applications usable by the image forming apparatus;
transmit, to the application store server, device specifying information that uniquely specifies the image forming apparatus;
receive the web page from the application store server, the information being specified based on the device specifying information thus transmitted and function information representing a function that the image forming apparatus has; and
display, on the operation unit, the received web page as an application list screen, wherein
the main body includes
a first processor and a first operating system (OS) to operate the printer or the scanner, and
a memory to store therein at least the device specifying information, the operation unit includes
a second processor and a second operating system, and
a store start application operated by the second processor under the second operating system, and
the second processor acquires, by the store start application, the device specifying information from the memory of the main body for the operation unit.

2. The image forming apparatus according to claim 1, wherein the circuitry is configured to display the application list screen such that applications other than the plurality of applications are not displayed.

3. The image forming apparatus according to claim 1, wherein the circuitry is further configured to
perform control for using, on the device, an application selected by the user from one or more applications displayed on the application list screen,
wherein, when the application selected by the user is a Web application representing an application that is used via the network, the circuitry executes a process for using the web application between the circuitry and an application server that holds the web application.

4. The image forming apparatus according to claim 1, wherein the function information is information in which each function identifying information that identifies a function installable in the image forming apparatus is associated with a value representing whether there is the function or the type of the function.

5. The image forming apparatus according to claim 1, wherein the application list screen is for downloading the specified application or subscription for use of the specified application.

6. The image forming apparatus according to claim 1, wherein
the operation unit further includes
a touch panel to receive an input of the request to the application store server and an input of the instruction to the main body and to display various types of information, and
a browser application that operates under the second operating system, and the second processor is configured to
display, on the touch panel, an icon of the store start application and an icon of the browser application,
when the user touches the icon of the store start application displayed, acquire the device specifying information and start the browser application,
pass, to the browser application, the acquired device specifying information and a URL of the application store server,
cause the browser application to transmit a request for the web page to the application store server using the URL,
display, as the application list screen, the web page that is specified based on the device specifying information by the browser application and that includes the plurality of applications usable by the image forming apparatus, and
install, in the image forming apparatus, an application selected by the user on the browser application.

7. The image forming apparatus according to claim 1, wherein
the plurality of applications included in the application list screen are applications operated by the second processor under the second operating system in the operation unit, and include an application to be installed in the operation unit and a web application that uses an application held in an application server by using the browser application of the operation unit, and the second processor is configured to download the application to be installed in the operation unit and the web application based on the selection on the browser application.

* * * * *